United States Patent [19]

Astl

[11] Patent Number: 4,680,838
[45] Date of Patent: Jul. 21, 1987

[54] DEVICE FOR DETACHABLY CONNECTING TWO ELEMENTS

[76] Inventor: Franz Astl, A-6345 Kössen, Tyrol, Austria

[21] Appl. No.: 600,212
[22] PCT Filed: Feb. 12, 1981
[86] PCT No.: PCT/AT81/00002
  § 371 Date: Oct. 9, 1981
  § 102(e) Date: Oct. 9, 1981
[87] PCT Pub. No.: WO81/02332
  PCT Pub. Date: Aug. 20, 1981

Related U.S. Application Data

[63] Continuation of Ser. No. 314,075, Oct. 9, 1981, abandoned.

[30] Foreign Application Priority Data

Feb. 12, 1980 [AT] Austria .................................. 749/80

[51] Int. Cl.⁴ ............................................. A44B 18/00
[52] U.S. Cl. ........................................ 24/442; 24/449
[58] Field of Search ............... 24/10 R, 306, 204, 256, 24/257, 303, 452, 449, 446, 442; 403/105, 292, 377

[56] References Cited

U.S. PATENT DOCUMENTS

| | | | |
|---|---|---|---|
| 1,819,225 | 8/1931 | Burman | 24/10 R |
| 2,678,228 | 5/1954 | Gerhardt | 24/303 |
| 2,959,832 | 11/1960 | Baermann | 24/303 |
| 3,128,476 | 4/1964 | Lash | 24/204 |
| 3,128,514 | 4/1964 | Parker et al. | 24/204 |
| 3,197,169 | 7/1965 | Burrows | 24/256 |
| 3,913,928 | 10/1975 | Yamaguchi | 277/212 F |
| 3,927,443 | 12/1975 | Brumlik | 24/442 |
| 4,054,337 | 10/1977 | Matt et al. | 308/3 R |
| 4,271,566 | 6/1981 | Perina | 2/DIG. 6 |

Primary Examiner—Robert Peshock
Assistant Examiner—Cary E. Stone
Attorney, Agent, or Firm—McAulay, Fields, Fisher, Goldstein & Nissen

[57] ABSTRACT

One or the female part of two releasably connected parts has a recess, cavity or the like, the second or male part is a couterpart insertable therein. Engaging elements are formed by at least one layer of elastic, vertically extending bristles, short fibers or the like, which are preferably electrostatically flocculated and engage on an uneven counterface. The face or faces provided with elastic bristles or the like as well as the counterface or counterfaces extend parallel to the moving directions of the two parts. In a preferred embodiment, the uneven counterface is a second layer of elastic, vertically extending bristles, short fibers or the like. During displacement in one direction, the bristles are moved into inclined positions and have to follow every change of direction. Thereby, a resistance has to be overcome, the resistance reaching a maximum in a change of direction of 180°, i.e. a reverse of direction, but being adapted to be overcome without damaging the bristles according to the invention. Hence, a continuous locking of the two parts without requiring additional locking devices as well as a repeatedly releasable and restorable connection is obtained.

19 Claims, 16 Drawing Figures

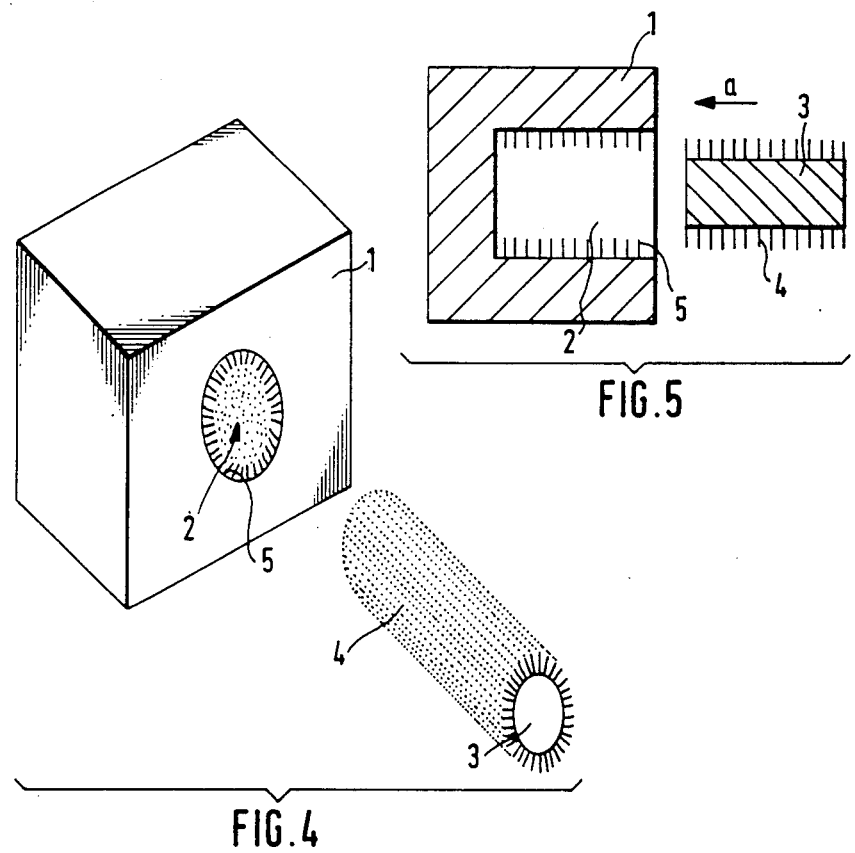
FIG.5
FIG.4
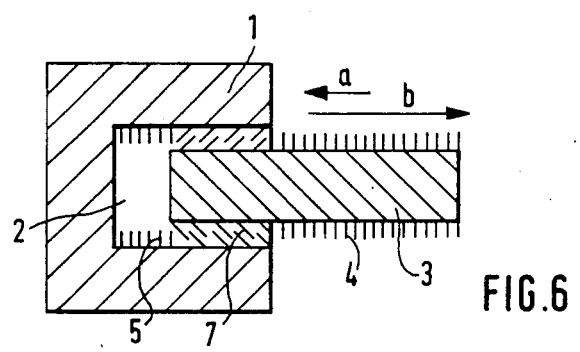
FIG.6

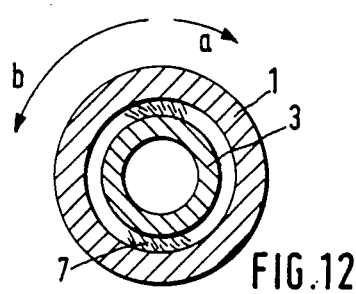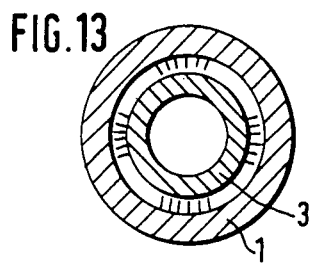
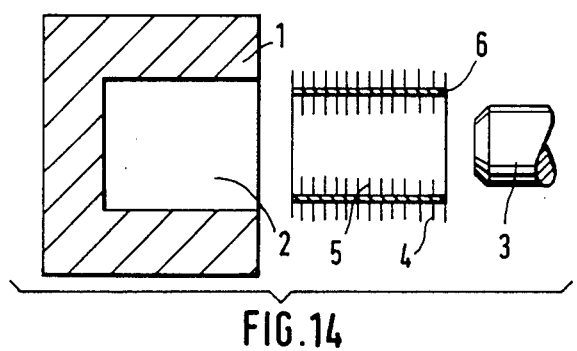
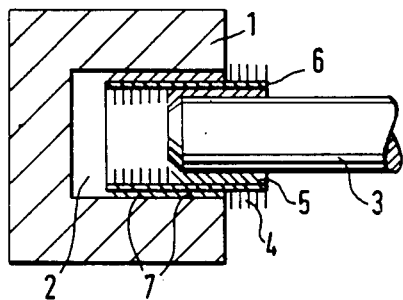
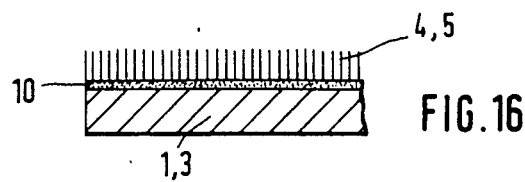

DEVICE FOR DETACHABLY CONNECTING TWO ELEMENTS

This application is a continuation of application Ser. No. 314,075 filed Oct. 9, 1981 which is now abandoned.

FIELD OF THE INVENTION

1. Background of the Invention

The invention relates to means for releasably connecting two parts, one of said parts forming a female part having a recess, cavity or the like and the other one of said parts forming a male part having a counterpart adapted to be inserted into said recess, cavity or the like or to be movable therein.

2. Description of the Prior Art

A dowel-like socket pin has, for example, been described in the DE-OS No. 1 945 377 which is provided with a multitude of teeth which are arranged over its circumference and project radially or towards the head of the fastening element from its outer surface. The corresponding bore has smooth walls. The fastening element is driven into the bore, the teeth thereby resting against the walls of the bore and being braced therein, when exposed to tensile forces. This connection is designed as an unreleasable connection which is only releasable under excessive stress, whereby one of the two parts is damaged and can no longer be repaired.

SUMMARY OF THE INVENTION

It is, therefore, the object of this invention to provide means forming a connection between two parts, when such parts are moved, such connection offering great resistance to the back movement of the two parts and at the same time eliminating the adverse effect of damaging said means, when overcoming said resistance, so that said connection is releasable and restorable.

According to the invention, this is achieved by arranging elastic elements extending substantially vertically to the moving direction on at least part of the faces of said female part or of said male part extending parallel to the moving direction, and by adapting each counterface of the male part or of the female part extending also parallel to the moving direction to be uneven, the elastic elements being a layer of adjacently arranged bristles, short fibers or the like, the lengths of said bristles being at least greater than the distance between the face provided with elastic elements and the face of contact of the raised areas on the uneven counterface.

The means according to the invention can be applied with any kind of connection between two parts. The two parts may be entirely separable, e.g. when a plug connection is provided between them. They may, however, not be entirely separable from each other so that a limited sliding or rotational movement is possible. The elastic elements, which are bristles or the like, may be made of any suitable material and have different characteristics. Both depends on the kind of parts which are to be connected and on the degree of rigidity of the connection. A person of skill in the art will have to choose the suitable criteria for the bristles depending on the use of the connection. Such criteria are the material, the elasticity, the number of bristles per surface unit, the size of the surface on which the bristles have to be arranged, the kind and size of uneven areas of the counterface etc.

When joining two entirely separate parts, e.g. a plug connection by means of fastening bolts and corresponding recesses, groove and tongue etc., the bristles or the like are inclined backwards, and their free ends are pressed against the uneven counterface. Thereby they penetrate into the lowered areas of the counterface and at the beginning of the back movement, they brace against the side faces of the raised areas whereby the close arrangement of such areas prevent an escape of the bristles or the like. When applying force, the inclined bristles or the like are compressed, thus, producing the resistance against pull-out forces. When applying increased force, the orientation of the bristles or the like is suddenly changed. They relax because of their elasticity, thereby moving in respect of the present moving direction into the same inclined position as during the inserting movement. During the further back movement, the resistance to pull-out forces is the same as the resistance to push-in forces and, hence, only the same small amount of force is required now. The elastic bristles as well as the uneven counterfaces are not subjected to any changes so that the released connection may be restored at any time.

If the movement is limited on both parts, i.e. a total separation of the two parts is not possible, the elastic bristles or the like are bent into an inclined position. The strong resistance at the start of the back movement as well as the weak resistance during further back movement are produced as afore-mentioned, such phenomena occuring at each reversing of the displacing movement. This is preferably employed with telescopic tubes, for example, which are continuously adjustable and lockable in any desired position contrary to the direction of insertion. If various, differently orientated displacing movements are possible weak resistance is produced in one moving direction. Great resistance is, however, produced in all other moving directions as the inclined positions of the bristles or the like must be changed in every case. Such phenomenon allows, for example, to employ the means according to the invention with ball-and-socket joints, which, with the exception of one single moving direction, are releasably locked in all other moving directions. After the resistance in each of said other directions has been overcome, such joints are movable in the changed direction, while all other directions are locked. Hence, a ball-and-socket joint provided with the means according to the invention does not need locking means for being fixed. An increase in the reverse resistance occurs, when the length of the bristles is greater than the distance between the face provided with the elastic elements and the bottom of the lowered areas of the uneven counterface. In this embodiment, the bristles or the like, which are additionally braced against the bottom of the lowered areas, are additionally deformed in longitudinal direction and, hence, increasingly compressed.

Finally, a preferred embodiment provides that the counterface, too, is provided with elastic elements extending therefrom substantially vertically and formed by a second layer of bristles or the like, their free ends forming the raised areas and their interspaces the lowered areas of the uneven counterface.

In this embodiment, the resistance which has to be overcome, when reversing the displacing movement, is substantially increased as both layers of bristles must simultaneously change their inclined positions. During the movement of insertion, the bristles are inclined in opposite directions and, hence, engage in one another at the start of the back movement. The resulting increased compression and friction effect a substantially stronger resistance and, hence, a firmer connection between the two parts. As soon as the bristles have changed their positions and are inclined towards the other side, the resistance to the back movement is reduced again to the weak resistance occuring during the movement of insertion.

At least one layer of bristles can be fixed to a carrier sheet, carrier plate or the like, which is arranged on the face or counterface. Further, at least one layer of bristles may be formed by a coating. It is preferably provided that each layer of bristles is electrostatically flocculated.

After having moved the counterpart to engage or brace the bristles, an undesired back movement may occur in some cases before the resistance become effective. Hence, it may further be provided that an elastic body is arranged between a stop limiting the maximal displacement path of the male part or counterpart in the female part or recess, cavity or the like and the front face of the male part, the elastic deformation under the force of displacement being greater than the resilience of the elastic bristles.

The means according to the invention may be employed within a very wide range. It may be employed in all cases in which the relative movement between the two parts should be possible to both sides but a strong resistance is to be overcome in each reversing point.

In the following, examples for applying the means according to the invention will be given:

1. All releasable plug connections by means of dowel pins, groove and tongue etc; for example, in the construction of furniture and buildings, with movable partition walls, fair booths, suspended ceilings, sheathing means and linings, picture frames;

2. all releasable closing means on commodities; on cases, bags, bottles, tins, girdles, belts, suspenders, caps for fountain-pens and ball pens, cover caps;

3. releasable connections on other objects; e.g. connections between tools and handles, connection between toy bricks, connections between the two members of door handles, connections on any mounting members, connections on hose pipes and rigid pipes, pipe connections for supports, telescopic tubes for stands, sliding sleeves on umbrellas, dismountable camping furniture, tents etc., linings for vehicles;

4. releasable connections for rotational movements; joint catches, ball-and-socket catches joint; between door frames and door frames and door wings, furniture doors, flaps etc., lock nuts;

5. releasable connections in which the means according to the inventions have a further function, e.g. in installation members with electrically conductive elastic elements, such as bulbs and sockets.

The material, length, elasticity, compactness of arrangement, diameter etc. of the bristles can be chosen depending on their use.

BRIEF DESCRIPTION OF THE DRAWING

In the following various embodiments of the invention will be described in greater detail by means of the figures of the drawing without being limited thereto.

FIGS. 4 through 6 show a schematic view of the means according to the invention employed in plug connections in structural members corresponding to FIG. 2 or 3, FIGS. 7 through 13 show a schematic view of a tube connection, FIGS. 14 and 15 show a second embodiment of a plug connection corresponding to FIG. 1, and FIG. 16 shows an enlarged view of a member coated with elastic elements.

DESCRIPTION ON THE PREFERRED EMBODIMENTS

Figure 1:
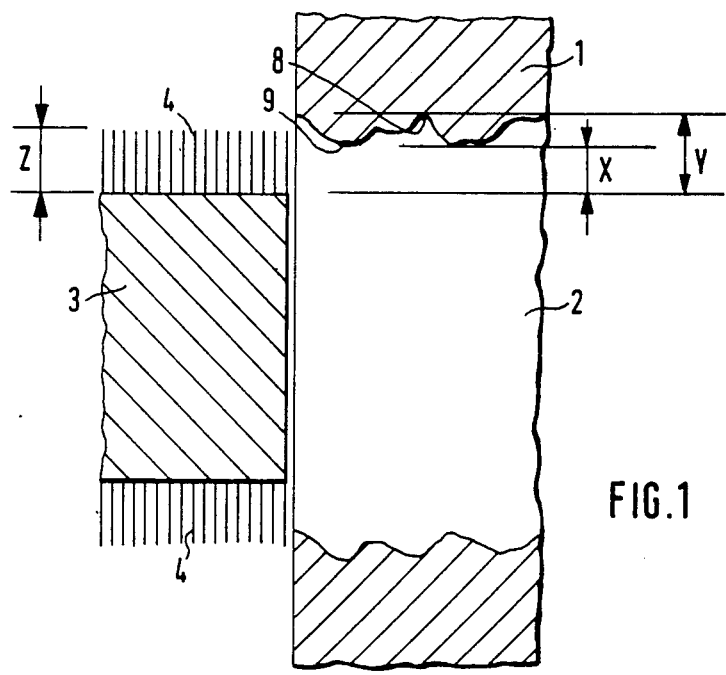
FIGS. 1 through 3 show various possibilities for the structure of the faces and counterfaces of two parts which are to be releasably connected.

The means according to the invention may always be used for joining two members 1, 3, if the two parts 1, 3 have surfaces which extend parallel to the moving direction and are moved past each other. One of said faces at least is provided with a layer 4 of bristles or similar elastic elements which are preferably electrostatically flocculated. Said parts may be coated by means of other methods, or the bristles may be fastened in a different way. The elastic bristles are in close arrangement so that the coated region looks similar to a brush. A female part 1 of said parts 1, 3 has a recess, lowered area, cavity, channel, slot, hollow space etc., which has been designated with the reference number 2. The other part, a male part 3, is a counterpart which is engageable, insertable or movable in said female part. Said male part 3 may be a projection, extension or the like of an object. In groove and tongue connections, it may, however, be the connecting member itself joining two parts 1 provided with recesses 2 or the like. As illustrated in FIG. 1, the male part 3 is preferably provided with a layer 4 of bristles, the length Z of said bristles being greater than the distance X between the face of the male part or counterpart part 3 carrying the bristles and an imaginary contact face of the uneven counterface of the part 1, i.e. the surface of the recess 2 or the like. The contact face may be planar, cylindrical or spherical, corresponding to the shape of the recess 2 or the like, and is in contact with the raised areas 9 of the counterface. The intermediately arranged lowered areas have been designated with the reference number 8, the bottom of said lowered areas is spaced from the face of the counterpart 3 carrying the bristles by the distance Y.

When inserting the male part 3 into the recess 2, the bristles of the layer 4 are inclined backwards and engage in the lowered area 8 of the counterface. Hence, resistance is offered against the sliding movement into the opposite direction, said resistance only being overcome by applying increased force, thus, reversing the inclined position of the bristles. When the bristles are in such reverse inclined position, the resistance against back movement corresponds again to the weak resistance of the movement of insertion.

Figure 2:
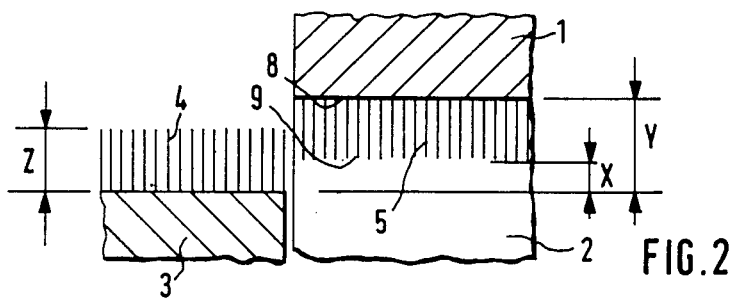
Figure 3:
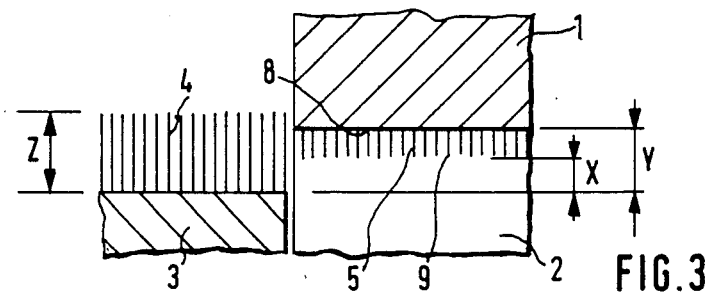
Figure 7:
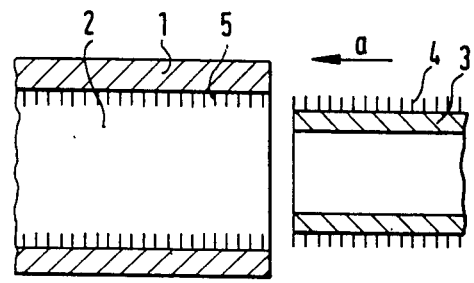
Figure 8:
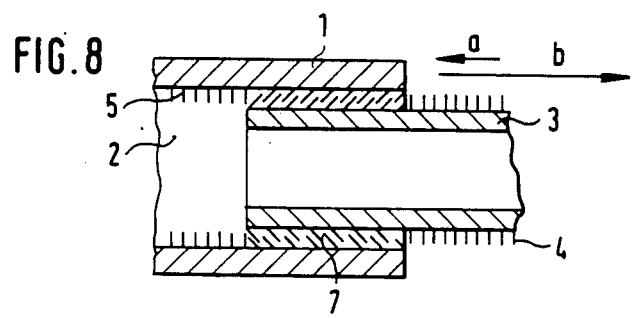

In FIG. 2, two layers of elastic bristles are arranged. The configuration and arrangement of the layer 4 on the male part 3 corresponds to the embodiment according to FIG. 1. The uneven counterface of the recess 2 is formed by a second layer 5 of elastic bristles, the free ends of the bristles corresponding to the raised areas 9 and the interspace to the lowered areas 8 of the uneven counterface according to FIG. 1. The resistance being offered to the reverse sliding movement is substantially increased, however, as the inclined engaging bristles are hooked into one another, and both layers 4, 5 of bristles are forced to change directions. The resistance to be overcome may be adapted to the length, elasticity and compactness of the bristles. FIG. 3, for example, shows bristles whose length Z is greater than the distance Y.

FIGS. 4 through 6 show schematic views of the means according to the invention employed in a plug connections, e.g. a dowel connection. The dowel forms the male or counterpart 3 on which a layer 4 of bristles is flocculated. In the female part 1, a second layer 5 of bristles is flocculated on the side wall of the bore or recess 2. The faces and counterfaces with bristles flocculated thereon, therefore, extend parallel to the moving direction. When inserting male part 3 into female part 1, a slight resistance a occurs as the inclined bristles slide past one another. The resistance b in the pull-out direction is substantially stronger until the bristles have changed their directions.

Figure 9:
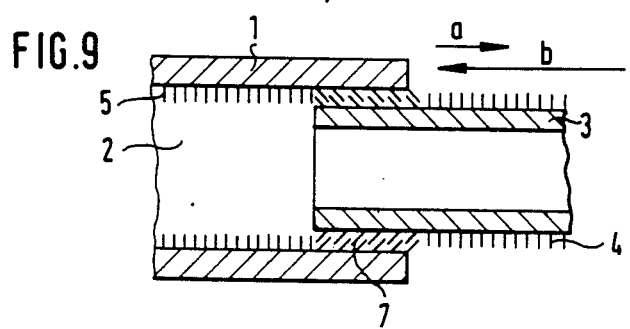

The cross-sections of the male part 3 and of the recess 2 may have any configuration. Round cross-sections create a further interesting effect, which has been illustrated in FIGS. 7 through 13. They show a connection between two tubes whose surfaces are provided with layers 4, 5 of elastic bristles. When inserting the tubes into each other, the bristles are moved into inclined positions and slide past one another. The sliding resistance a is weak, the resistance b against the back movement is strong, however. The tubes may, therefore, be inserted into each other over any desired length, and a high resistance b of the bristles is put up in any position within the length of insertion 7. If the further insertion of the tube or part 3 into the tube or part 1 is to be prevented the orientation of the bristles within the length of insertion 7 only has to be reversed. As can be seen in FIG. 9, the resistance b is put up against the movement of insertion. The weak resistance a only is offered against the back movement during which the bristles slide past one another. For reversing the bristles and, hence, for changing the direction of the sliding resistance, it is only required to overcome such resistance, thereby effecting a change of the inclined positions of the bristles.

Figure 10:
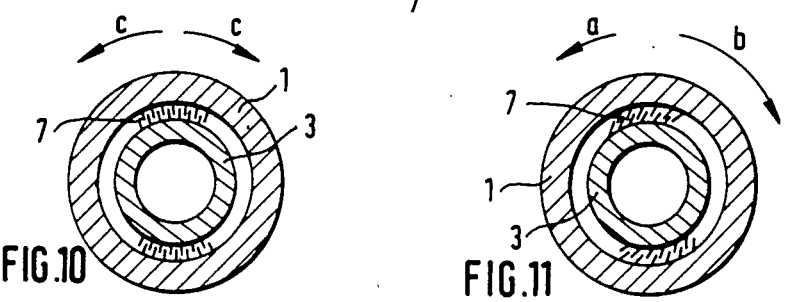
Figure 11:
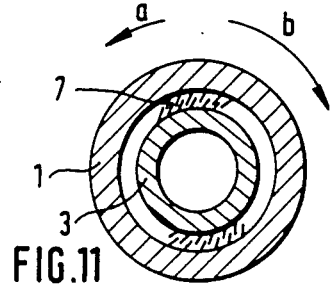

If the length of insertion 7 is very great, great inapplicable forces may be required for overcoming the resistance by change of direction. Because of the circular cross-sections the tubes can be rotated against each other. FIG. 10 shows a cross-section corresponding to a position according to FIG. 8. As can also be seen in this Figure, the layers 4, 5 need not extend over the entire surfaces of parts 1, 3 directed towards each other. Said layers 4, 5 may also be provided in certain portions only. From the position illustrated in FIG. 8, the same resistance c has to be overcome in both directions of rotation. Said resistance c is obviously stronger than the sliding resistance a in the sliding direction but weaker than the resistance b in opposite direction. This is due to the fact that the angle by which the inclined bristles of each layer 4, 5 have to turn, when changing from the sliding movement to the rotating movement, is substantially smaller than when reversing the sliding direction.

When the change from the sliding movement to the rotational movement has been effected, i.e. when the resistance c has been overcome, the resistances a and b are alternately put up in the two directions of rotation, i.e. during further rotation of the internal, male part 3, the bristles slide past one another. The resistance a is put up in the direction of rotation of the internal part 3, opposite thereto the resistance b. When the resistance b has been overcome by reversing the direction of rotation of the internal part 3, the resistances a, b have also reversed (FIG. 12). When the tubes shall be moved from the positions illustrated in FIG. 11 or 12, i.e. after rotation of the two tubes, and displaces along their axes, the resistance c has to be overcome in both directions at the start of the displacing movement as a charge but no reverse of the moving direction takes place. If the tubes are to be further inserted into each other the bristles change into the position according to FIG. 8. If the length of insertion is to be reduced they change into the position according to FIG. 9.

As a result, the movement can be reversed by applying reduced instantaneous force if the two parts are slightly rotated between the push-in and pull-out movement. If engagement surfaces 7 are only provided on portions of the circumference a rotation by 90° can, according to FIG. 13, separate the layers of bristles from one another, whereby their longitudinal displacement as well as the resistance a can be eliminated. A quarter rotation moves the bristles into the positions illustrated in FIG. 11 or 12, whereby the connection is obtained.

The means according to the invention is, therefore particularly suitable for any locking of ball-and-socket joints as in one direction only a low resistance a is put up during movement, such resistance increasing with the angle of the moving direction towards the original direction and reaching at its maximum, when reversing the moving direction. Such maximum can, however, be produced in each direction if the parts are moved into the opposite direction until the bristles are in alignment.

FIGS. 14 and 15 show an embodiment according to the representation of FIG. 1. The recess 2 and the male or counterpart 3 are provided with uneven counterfaces. Each counterface is associated with a layer 4, 5 of bristles arranged on a sleeve-like intermediate member and extending into opposite directions. When inserting the parts into each other, the bristles of the two layers 4, 5 are again bent into opposite directions and engage in the counterfaces. The intermediate member 6 may be of metal or plastics.

FIG. 16 shows an enlarged view of a portion provided with a layer 4, 5 of bristles. The bristles are preferably electrostatically flocculated onto an adhesive layer 10 coating the parts 1, 3. It would also be possible to arrange the bristles on a carrier sheet and to glue said sheet to the faces and counterfaces or to portions thereof.

In embodiments which are exclusively linearly displaceable, an elastic body may eliminate in each reversing point a certain resilience which is produced until the inclined bristles engage on the counterface. Said body is arranged as a stop at the end of the recess 2.

Beside their actual task of providing a releasable connection, the layers 4, 5 of bristles may also have other functions. They may be used as sealing means in tube connections, when the medium flows at low pressure. Further, they can be made of metal and function as electrically conductive members, e.g. in bulbs and sockets in which the thread has already been replaced by the means according to the invention.

What is claimed is:
1. In a releasable connecting appliance:
   a female part forming a hole defined by an inner surface;
   a male part defined by an outer surface adapted for movement from a disengaged position in a predetermined direction in said hole to assume an engaged position;
   each of said surfaces having an area extending at least partly parallel to said direction, at least a portion of said area of each of said surfaces being uneven as to show elevations and depressions;

a layer of adjacently arranged elastic fiber elements in at least one of said surfaces, the peaks of said fiber elements forming the elevations in said at least one of said areas;

the length of said fiber elements on at least one surface being greater than the spacing between the depressions on said at least one surface and the elevations of the other surface;

said fiber elements being straight over their entire length and free of hook-like recesses on their surface for interengagement with said surface;

whereby during insertion of said male part into said female part a bending force has to be overcome to bring said fiber elements from their normal position relative to the direction of insertion to an inclined position in the direction of insertion; and said elastic fiber elements resisting a movement in the opposite direction.

2. In a releasable connecting appliance:

a female part forming a first hole, said first hole being defined by a first inner surface;

a first male part movable from a disengaged position in a predetermined direction into said first hole to assume therein an engaged position;

a first outer surface defining said first male part;

said first male part having a second hole having a second inner surface;

a second male part movable from a disengaged position in said direction into said second hole to assume an engaged position;

a second outer surface defining said second male part;

said first inner surface and said first outer surface together forming a first pair of associated surfaces;

said second inner surface and said second outer surface together forming a second pair of associated surfaces;

each of said pairs of associated surfaces having an area extending at least partially parallel to said direction, at least a portion of said area being uneven to show elevations and depressions;

a layer of adjacently arranged elastic fiber elements forming the elevations of said uneven area on at least a selected area of at least one surface in each of said pairs of associated surfaces;

each of said fiber elements extending substantially normal to said direction and being straight over their entire length, the length of each of said fiber elements corresponding to the height of the elevations over the depressions and being at least greater than the distance between the depression of one of said surfaces and the elevation of said other of the pair of associated surfaces;

each of said fiber elements being straight over their entire length and free of hook-like recesses on their surface for interengagement with said connecting surface;

whereby during insertion of said male part into said female part a bending force has to be overcome to bring said fiber elements from theier normal position relative to the direction of insertion to an inclinded position in the direction of insertion; and ng movement in each of said fiber elements permitting movement in the direction of insertion while resisting a movement in the opposite direction.

3. In a releasable connecting appliance:

a female part forming a hole defined by an inner surface;

a male part defined by an outer surface adapted for movement in a predetermined direction from a disengaged position separately from said female part into said hole to assume an engaged position in said female part;

each of said surfaces having an area extending at least partly parallel to said direction, in said engaged position of said male part, each of said surfaces being uneven and having elevation and depressions;

a layer of adjacently arranged elastic fiber elements on each of said areas so as to face each other in said engaged position wherein the fiber elements of one of said layers overlap the fiber elements of the other one of said layers opposed to said one layer so as to interengage each other;

said fiber elements extending substantially normal to said direction in said disengaged position, the height of said fiber elements on at least one of said surfaces being greater than the distance between the depressions on each of said surfaces;

said fiber elements being straight over their entire length and free of hook-like recesses on their surface and when interengaged opposing any change in the direction of movement;

whereby during insertion of said male part into said female part a binding force has to be overcome to bring said fiber elements from their normal position relative to the direction of insertion to an inclined position in the direction of insertion; and said fiber elements resisting a movement in the opposite direction.

4. In a releasable connecting appliance as claimed in claim 1, wherein:

said male part includes first and second male members said first male member being movable from a disengaged position in a predetermined direction into said hole to assume therein an engaged position;

a first outer surface defining said first male member;

said first male member including an inner surface surrounding a second hole;

said second male member being movable from a disengaged position in said direction into said second hole to assume an engaged position;

a second outer surface defining said second male member;

said first-mentioned inner surface and said first outer surface together forming a first pair of associated surfaces;

said second-mentioned inner surface and said second outer surface together forming a second pair of associated surfaces;

each of said pairs of associated surfaces having an area extending at least partly parallel to said direction, at least a portion of said last-mentioned area being uneven to show elevations and depressions;

each of said associated, surfaces have a predetermined minimum distance from each other measured from the elevations of one surface to the depressions of the other surface and a predetermined maximum distance measured between said last-mentioned depressions in the engaged positions; and said layer of said adjacently arranged elastic fiber elements forming the elevations of said uneven area on at least a selected area of at least one surface in each of said pairs of associated surfaces.

5. In the releasable connecting appliance as set forth in one of claims 1, 2, or 3, wherein said layer of adjacently arranged fiber elements is electrostatically flocculated.

6. In the releasable connecting appliance as set forth in one of claims 1, 2, 3, wherein said layer comprises fiber elements of magnetizable material.

7. In the releasable connecting appliance as set forth in claim 1, 2, or 3, wherein each of said layers comprises fiber elements of magnetizable material, the layers facing each other being magnetized with different poles.

8. In the releasable connecting appliance as set forth in claim 1, 2, 3, including elastically deformable stop means comprising the fibers which are elastically deformable by the movement in one of said directions, the elastic deformation in one of said directions being greater than the resilience of said fiber elements.

9. In the releasable connecting appliance as set forth in claim 1, 2 or 3, wherein said layer of adjacently arranged fiber elements includes a coating covering at least a portion of at least one of said areas.

10. In the releasable connecting appliance as set forth in claims 1, 2 or 3, further comprising at least one carrier member for carrying one of said layers.

11. In the releasable connecting appliance as set forth in claim 1, 2 or 3, wherein the fiber elements are formed of magnetizable material, and each said surface is differently magnetized.

12. In the releasable connecting appliance as set forth in claim 1 or 2, wherein:

each of said surfaces includes a layer of the said adjacently arranged elastic fiber elements;

said fiber elements of one of said layers overlapping the fiber elements of the other of said layers opposed to said one layer so as to interengage each other.

13. In the releasable connecting appliance as claimed in claim 1 or 2, wherein the height of said fibers on the other of said surfaces is less than the height between the depressions on each of said surfaces but greater than the distance between the elevations on each of said surfaces.

14. In the releasable connecting appliance as claimed in claim 1 or 2, wherein:

the height of said fibers on one of said surfaces is greater than the distance between the depressions on each of said surfaces.

15. In the releasable connecting appliance as set forth in claim 1 or 2, wherein the inner surface of said female part has an uneven surface and is free of fibers.

16. In the releasable connecting appliance as set forth in claim 1 or 2, wherein each of said surfaces includes said layer of adjacently arranged fibers, and the fibers on one of said surfaces is longer than the spacing distance between the depression on each of said surfaces in the engaged position of said parts.

17. In the releasable connecting appliance as claimed in claim 1, 2, or 3, wherein the height of said fibers on each of said surfaces is less than the distance between the depressions on each of said surfaces and greater than the distance between the elevations on each of said surfaces.

18. In the releasable connecting appliance as set forth in claim 1, 2, or 3, wherein said fiber elements extend substantially normal to the direction in said disengaged position.

19. In the releasable connecting appliance as claimed in claim 1, 2, 3, wherein the height of said fibers is greater than the distance between the elevations on said one surface and the depressions on said other surface.

* * * * *